US012809111B2

(12) United States Patent
Li

(10) Patent No.: US 12,809,111 B2
(45) Date of Patent: Nov. 24, 2026

(54) HANGING RACK TYPE SCREEN PROTECTOR

(71) Applicant: RIGHT GROUP CENTRAL CO., LTD., New Taipei (TW)

(72) Inventor: Chuan-En Li, New Taipei (TW)

(73) Assignee: RIGHT GROUP CENTRAL CO., LTD., New Taipei (TW)

( * ) Notice: Subject to any disclaimer, the term of this patent is extended or adjusted under 35 U.S.C. 154(b) by 331 days.

(21) Appl. No.: 18/404,924

(22) Filed: Jan. 5, 2024

(65) Prior Publication Data

US 2025/0028097 A1 Jan. 23, 2025

(30) Foreign Application Priority Data

Jul. 18, 2023 (TW) ................................ 112126779

(51) Int. Cl.

*G02B 7/00* (2021.01)
*G02B 5/18* (2006.01)
*G02B 5/20* (2006.01)

(52) U.S. Cl.

CPC ........... *G02B 7/006* (2013.01); *G02B 5/1866* (2013.01); *G02B 5/203* (2013.01)

(58) Field of Classification Search

USPC ........................................................ 359/567
See application file for complete search history.

(56) References Cited

U.S. PATENT DOCUMENTS

| | | | | |
|---|---|---|---|---|
| 2020/0241181 A1* | 7/2020 | Lee | ...................... | G02B 5/1866 |
| 2021/0157360 A1* | 5/2021 | Gudsoe | ................. | G06F 1/1609 |
| 2024/0045167 A1* | 2/2024 | Swartz | .................. | G02B 7/006 |

* cited by examiner

*Primary Examiner* — Dung T Nguyen

(57) ABSTRACT

A hanging rack type screen protector is configured to protect a display screen of an electronic device and prevent others from peeking at images, pictures, or content presented on the display screen. The screen protector includes: a functional film body including a first left combining portion formed in an upper left region and a first right combining portion formed in an upper right region; a left hanging rack component with approximately L-shaped profile which is formed by a left hanging rack portion and a second left combining portion; and a right hanging rack component with approximately L-shaped profile which is formed by a right hanging rack portion and a second right combining portion; where the functional film body is freely hung on or freely detached or removed from the electronic device by the left hanging rack component and the right hanging rack component.

17 Claims, 11 Drawing Sheets

HANGING RACK TYPE SCREEN PROTECTOR

CROSS REFERENCE TO RELATED APPLICATIONS

The present application claims the benefit of Taiwanese Patent Application No. 112126779 filed on Jul. 18, 2023, the contents of which are incorporated herein by reference in their entirety.

FIELD OF TECHNOLOGY

The present invention relates to a screen protector, in particular to a hanging rack type screen protector capable of reducing the thickness of a functional material, simplifying the manufacturing process, greatly reducing the production cost, and improving the convenience of assembly, especially a hanging rack type screen protector applicable to a touch screen without causing the problems such as the degradation of touch sensing.

PRIOR ART

At present, 3C devices such as laptops, tablet computers, and mobile phones have become mature and fully functional. Users often use 3C devices to handle affairs in daily life or work. Especially in public places, if the users handle important information, confidential information, or private information by the above 3C devices, they do not want to be peeped by others.

As a result, to protect the privacy of the users from being infringed, a screen protector for covering the front of a screen has been developed in the market at present. The screen protector can limit an angle at which the content on the screen can be seen, making it difficult for people around to peep at it arbitrarily.

However, most of screen protectors in the prior art are mounted on screens of desktop computers or laptops in a manner of direct attaching or adhering or by adding adsorption accessories or magnetic strips. When mounted in a manner of adhering or attaching, the screen protectors cannot be taken down arbitrarily to discuss information presented on pictures with others, and residual glue will be left on the screens when the screen protectors are taken down. Moreover, when that screen protectors are erected in front of the screens by adding the adsorption accessories or the magnetic strips, the screen protectors can be taken down from the screens at any time, but the definition of the pictures in the screens is affected because the screen protectors cannot be tightly attached to the screens; and sometimes, there is a risk of fall-off due to insufficient magnetic intensity, or a problem of difficult adsorption due to mismatch between positive and negative poles of the magnetic strips and magnetic poles of electronic devices in position. In addition, there is a defect that the manufacturing cost will be increased during the addition of the adsorption accessories or the magnetic strips.

Therefore, related manufacturers in this industry are all looking forward to developing a screen protector capable of solving and overcoming the above problems and deficiencies in the prior art.

SUMMARY

In view of this, a main objective of the present invention is to provide a hanging rack type screen protector capable of effectively solving and overcoming the above problems and deficiencies in the prior art, reducing the thickness of a functional material, simplifying the manufacturing process, greatly reducing the manufacturing and production costs, and improving the convenience, stability, reliability and the like of assembly, especially a hanging rack type screen protector applicable to a touch screen without causing the problems such as the degradation of touch sensing.

That is, the present invention provides a hanging rack type screen protector, having functions of protecting a display screen of an electronic device and preventing others from peeking at images, pictures, or content presented on the display screen, and further having functions of reducing the intensity of blue light and preventing glare and the like to protect eye and vision health of a user. The screen protector provided by the present invention includes: a functional film body, having a plurality of optical gratings configured to define a viewing area, so as to limit passing light to a range of allowable visual angles, the functional film body including a first left combining portion formed in an upper left region and a first right combining portion formed in an upper right region; a left hanging rack component, having an appearance structure which is approximately L-shaped from the side and formed by a left hanging rack portion and a second left combining portion, the second left combining portion of the left hanging rack component being correspondingly assembled on the first left combining portion of the functional film body and being hung on the electronic device by the left hanging rack portion; and a right hanging rack component, having an appearance structure which is approximately L-shaped from the side and formed by a right hanging rack portion and a second right combining portion, the second right combining portion of the right hanging rack component being correspondingly assembled on the first right combining portion of the functional film body and being hung on the electronic device by the right hanging rack portion; where the functional film body is freely hung on or freely detached or removed from the electronic device by the left hanging rack component and the right hanging rack component.

In an embodiment, the functional film body includes at least: a functional layer, which is a light-transmitting film or a light-transmitting laminated body; a top surface layer, formed on an upper side of the functional layer; and a bottom surface layer, formed on a lower side of the functional layer.

In an embodiment, the functional film body further includes an auxiliary fixing piece configured to improve the fixation strength between the functional film body and the electronic device, where the auxiliary fixing piece is a magnetic component or a non-magnetic component.

In an embodiment, the magnetic component is a permanent magnetic component, a soft magnetic component, or a gyromagnetic component formed from at least one of a metal, an alloy, or a ferrite.

In an embodiment, in the functional film body, a first bonding layer is further included between the functional layer and the top surface layer; and a second bonding layer is further included between the functional layer and the bottom surface layer.

In an embodiment, the second left combining portion of the left hanging rack component is correspondingly assembled on the first left combining portion of the functional film body in a freely detachable manner, and the second right combining portion of the right hanging rack component is correspondingly assembled on the first right combining portion of the functional film body in a freely detachable manner.

In an embodiment, the left hanging rack component is further provided with a left attaching body at the left hanging rack portion, and the right hanging rack component is further provided with a right attaching body at the right hanging rack portion, where the left attaching body and the right attaching body are formed from a wave-absorbing material, a magnetic material, or a repeatably attaching material.

In an embodiment, the hanging rack type screen protector further includes a left adsorption component and a right adsorption component, where the left adsorption component and the right adsorption component are formed from a wave-absorbing material, a magnetic material, or a repeatably attaching material and are arranged on a peripheral side of the electronic device in a freely detachable manner.

In an embodiment, the second left combining portion of the left hanging rack component is correspondingly assembled on the first left combining portion of the functional film body in a fixing manner, and the second right combining portion of the right hanging rack component is correspondingly assembled on the first right combining portion of the functional film body in a fixing manner, where the fixing manner includes at least one of adhering, gluing, laminating, attaching, fusing, pressing, and fastening.

In an embodiment, the first left combining portion of the left hanging rack component corresponds in size and thickness to a first notch of the second left combining portion of the functional film body, and the first right combining portion of the right hanging rack component corresponds in size and thickness to a second notch of the second right combining portion of the functional film body, such that the first left combining portion of the left hanging rack component and the first right combining portion of the right hanging rack component can be assembled on the functional film body in a manner of forming a single plane or a coplanar surface.

In an embodiment, the first notch and the second notch have a symmetric or asymmetric structure.

In an embodiment, the left hanging rack portion and the second left combining portion are formed from a homogeneous or heterogeneous material, and the right hanging rack portion and the second right combining portion are formed from a homogeneous or heterogeneous material.

In an embodiment, when the left hanging rack portion and the second left combining portion are formed from a homogeneous material, the left hanging rack portion and the second left combining portion are formed integrally or non-integrally; and when the right hanging rack portion and the second right combining portion are formed from a homogeneous material, the right hanging rack portion and the second right combining portion are formed integrally or non-integrally.

In an embodiment, the electronic device is a wearable electronic device, a portable smart device, a smart phone, a mobile phone, a tablet, a laptop, or a desktop computer.

In an embodiment, the functional film body is further provided with an avoidance portion, and a position where the avoidance portion is provided corresponds to a position of a functional component of the electronic device, so as to avoid shielding or covering part or whole of the functional component.

In an embodiment, the functional component includes at least one of an image capture component, an audio transceiver component, an optical photography component, and a digital transmission component.

In an embodiment, the avoidance portion includes at least one of an avoidance groove, a notch, an opening, a recess, a groove, a groove hole, a via hole, an open hole, and a through hole.

In an embodiment, the left attaching body and the right attaching body are heteropolar staggered magnetic components, single N-pole discontinuous magnetic components, single S-pole discontinuous magnetic components, single N-pole two-end magnetic components, or single S-pole two-end magnetic components.

In an embodiment, the magnetic material for forming the left attaching body and the right attaching body includes at least one of a sheet-shaped magnet, a strip-shaped magnet, a flexible magnet, an arc-shaped magnet, a permanent magnet, a non-permanent magnet, a natural magnet, an electromagnet, and a heat-resistant magnet.

Through the design of the structure of the present invention, the connecting pieces are correspondingly assembled at the combining portions of the film body, and then the film body provided with the connecting pieces is hung on the electronic device, to maintain the privacy during use; and the screen protector can be easily mounted or taken down, thereby greatly improving the convenience of assembly.

In addition, with a structural pattern of the connecting pieces in the present invention, the production cost can be reduced.

DETAILED DESCRIPTION OF THE EMBODIMENTS

Figure 1A:
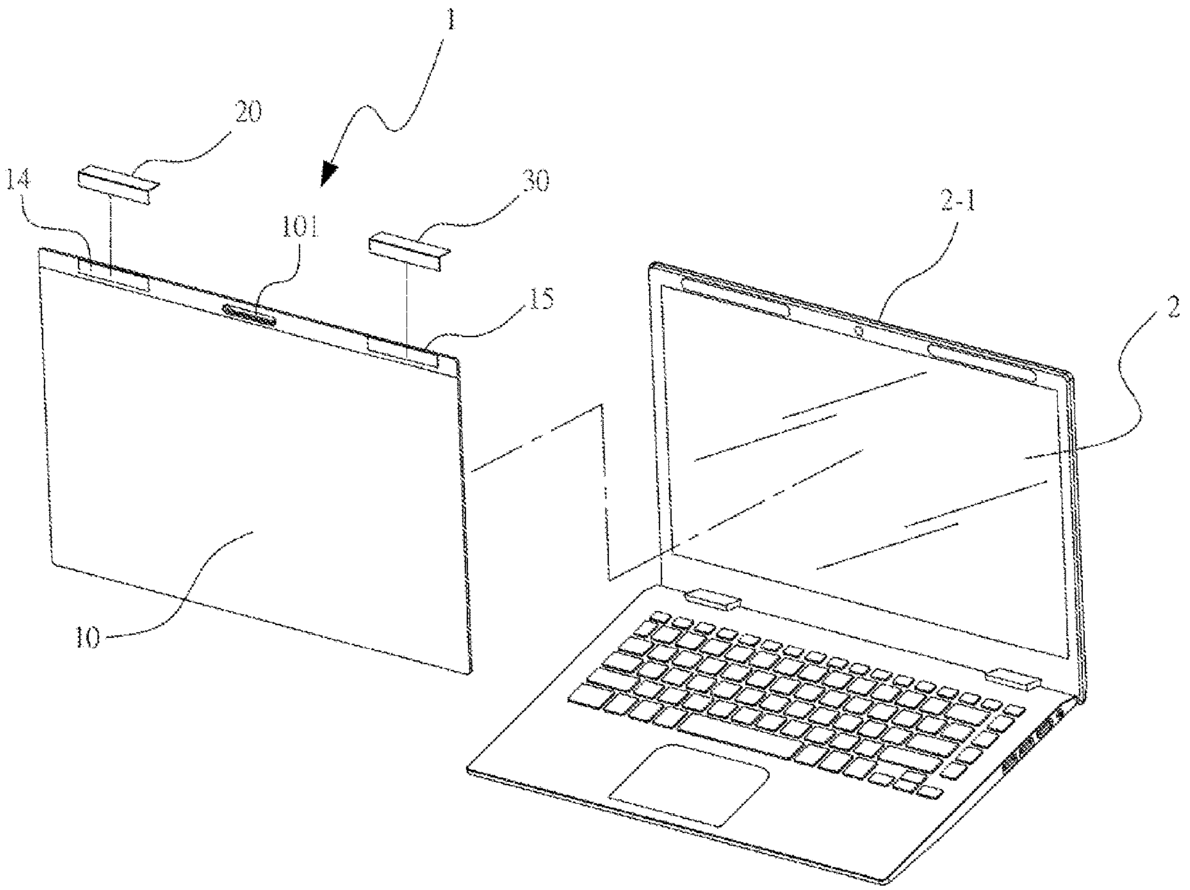
FIG. 1A shows a three-dimensional exploded view of an embodiment of a hanging rack type screen protector provided by the present invention.
Figure 1B:
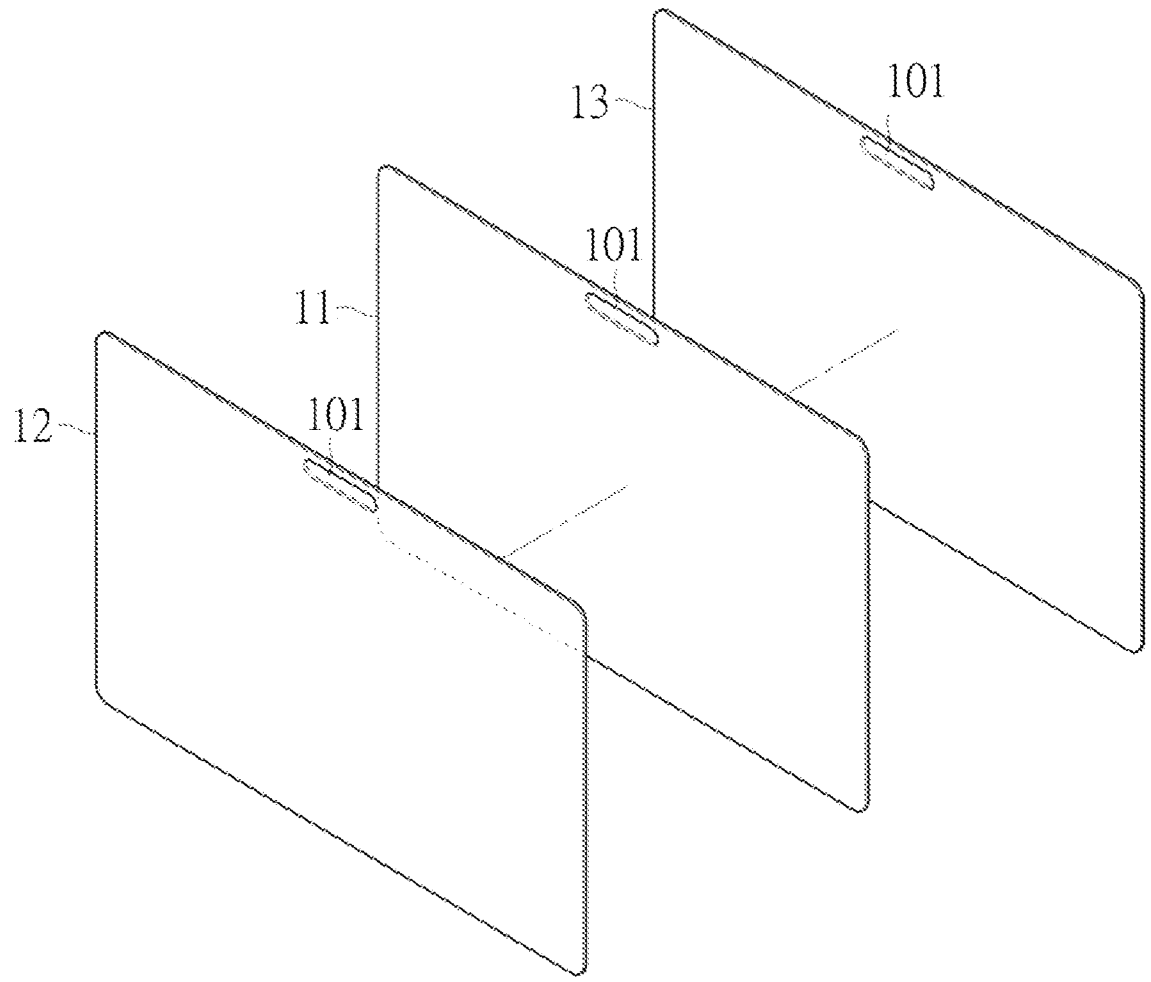
FIG. 1B shows a three-dimensional exploded view of a functional film body in an embodiment of a hanging rack type screen protector provided by the present invention.

The above objective and structural and functional characteristics of the present invention will be described according to preferred embodiments of the accompanying drawings.

Hereinafter, for the composition and technical content of the hanging rack type screen protector provided by the present invention, various applicable examples are listed and detailed descriptions are provided with reference to the accompanying drawings. However, the present invention is not limited to the listed embodiments, drawings, or detailed descriptions.

Moreover, it should also be understood by those skilled in the art that the listed embodiments and the accompanying drawings are used for reference and explanation only, but not to limit the present invention; and any inventions that can be easily modified or changed based on such description are considered to be within the scope of the spirit and purpose of the present invention, and certainly, such inventions are also included in the scope of the patent application for the present invention.

Furthermore, the directional terms mentioned in the following embodiments, such as "up", "down", "left", "right", "front", and "back", are merely the directions with reference to the accompanying drawings. Therefore, the directional terms used are used to explain rather than to limit the present invention; besides, in the following embodiments, the same or similar components will use the same or similar reference signs for the components.

Referring to FIGS. 1A, 1B, 2A, and 2B, which show three-dimensional exploded views of an embodiment of a hanging rack type screen protector provided by the present invention and a three-dimensional view and side view of a hanging rack type screen protector, respectively. As shown in figure, a hanging rack type screen protector 1 includes a functional film body 10, a left hanging rack component 20, and a right hanging rack component 30. In this embodiment, an appearance structure of the hanging rack type screen protector 1 is mainly determined by an appearance of a display module of an electronic device 2. For example, the appearance may be a rectangular shape or another shape, but it is not limited thereto and should be made clear in advance.

Furthermore, the screen protector 1 is usually mounted on an outer side or a surface side of the electronic device 2 to protect an object of the electronic device 2 or its screen, and is generally used as a protective film, a protective plate, a protective component, or a protective sheet for the screen of the electronic device 2. In a specific embodiment, the screen protector 1 needs to have at least a basic function of protecting the screen, preferably it further has other specific functions. For example, the screen protector has at least one or more specific functions of preventing peeping, resisting blue light, resisting radiation, resisting static electricity, preventing glare, resisting ultraviolet light, preventing wear, resisting friction, and resisting bending. In addition, according to the technical idea of the present invention, the specific functions of the screen protector 1 are not specifically limited to the above basic function or specific functions.

Furthermore, the functional film body 10 is a basic object used to form the screen protector 1, and is usually used as a protective film, a protective plate, a protective component, or a protective sheet for the screen of the electronic device 2. In a specific embodiment, the functional film body 10 needs to have at least a basic function of protecting the screen, preferably it further has other specific functions. For example, the screen protector has at least one or more specific functions of preventing peeping, resisting blue light, resisting radiation, resisting static electricity, preventing glare, resisting ultraviolet light, preventing wear, resisting friction, and resisting bending. In addition, the functions of the functional film body 10 are not specifically limited to the above basic function or specific functions, and other functions can also be added within the scope of the technical idea of the present invention.

In this embodiment, the functional film body 10 has a plurality of optical gratings (not shown in figure) configured to define a viewing area, so as to limit passing light to a range of allowable visual angles, and includes at least: a functional layer 11, which is a light-transmitting film or a light-transmitting laminated body; a top surface layer 12, formed on an upper side of the functional layer 11; and a bottom surface layer 13, formed on a lower side of the functional layer. For example, the functional film body 10 may be a light-transmitting laminated body including at least a functional layer 11, a top surface layer 12 formed on an upper side of the functional layer 11, and a bottom surface layer 13 formed on a lower side of the functional layer 11. According to the technical idea of the present invention, the functional layer 11 in the present invention generally has at least one or more specific functions of preventing peeping, resisting blue light, resisting radiation, resisting static electricity, preventing glare, resisting ultraviolet light, preventing wear, resisting friction, and resisting bending; in addition, other functions can also be added within the scope of the technical idea of the present invention.

Furthermore, in an embodiment, an auxiliary fixing piece arranged on the functional film body 10 can be further included and configured to improve the fixation strength between the functional film body 10 and the electronic device 2. For example, the auxiliary fixing piece (not shown in figure) may be a magnetic component or a non-magnetic component.

In addition, the magnetic component configured to form the auxiliary fixing piece may be a permanent magnetic component, a soft magnetic component, or a gyromagnetic component formed from at least one of a metal, an alloy, or a ferrite, but it is not limited thereto.

Furthermore, as long as a position where the auxiliary fixing piece is formed does not interfere with the basic function of the functional film body 10, any forming positions are suitable without special restrictions within the scope of the spirit of the present invention. For example, the auxiliary fixing piece may be arranged on the upper side of the functional layer 11 when located below the top surface layer 12, or on the lower side of the functional layer 11 when located above the bottom surface layer 13; or the auxiliary fixing piece may be formed on the upper and lower sides of the functional layer 11.

Moreover, in the functional film body 10, a first bonding layer is further included between the functional layer 11 and the top surface layer 12; and a second bonding layer is further included between the functional layer 11 and the bottom surface layer 13. As long as a forming material of the first bonding layer and the second bonding layer does not interfere with the basic function of the functional film body 10, any materials are applicable without special restrictions within the scope of the spirit of the present invention. For example, optically clear acrylic adhesives (also known as "OCA adhesives"), silica gels, polyurethane (PU) adhesives, nano adhesives, etc. may be used. Furthermore, within the scope of not affecting the effects of the present invention, a repeatably attaching material such as a hook-and-loop fastener and a patch may be further used to enhance the fixation strength between the functional film body 10 and the electronic device 2.

In an embodiment, a thickness of the first bonding layer and the second bonding layer is not specifically limited, for example, may be 50 μm, 100 μm, 175 μm, or another thickness according to user requirements. Furthermore, the first bonding layer and the second bonding layer have no special restrictions on the adhesion of a glass or polyethylene terephthalate (PET) substrate after attachment, for example, the adhesion may be at least 10 N or more per unit size.

In addition, the optical transmittance of the first bonding layer and the second bonding layer is preferably 90% or more, more preferably 95% or more, and most preferably 98% or more; the haze of the first bonding layer and the second bonding layer is preferably 1% or less, more preferably 0.5% or less, and most preferably 0.2% or less; and preferably, the first bonding layer and the second bonding layer do not produce a birefringence effect, that is, when light passes through the functional film body 10, zero retardation does not occur.

The foregoing functional film body 10 includes a first left combining portion 14 formed in an upper left region and a first right combining portion 15 formed in an upper right region.

Figure 2A:
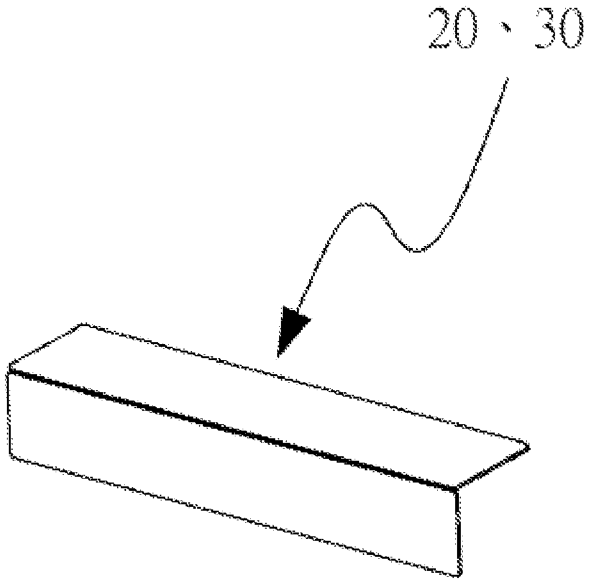
FIG. 2A shows a three-dimensional view of an embodiment of a hanging rack type screen protector provided by the present invention.
Figure 2B:
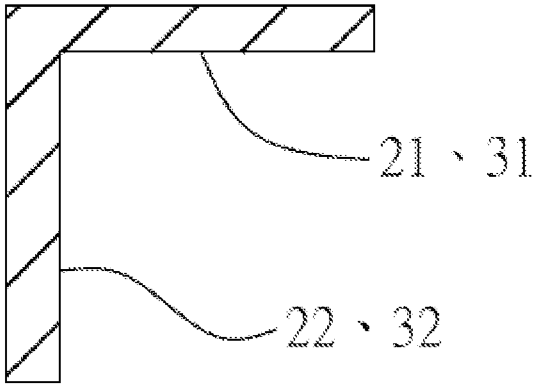
FIG. 2B shows a side view of an embodiment of a hanging rack type screen protector provided by the present invention.

The left hanging rack component 20 has an appearance structure which is in an approximately L shape as shown in FIG. 2B from the side and is formed by a left hanging rack portion 21 and a second left combining portion 22. The second left combining portion 22 of the left hanging rack component 20 is correspondingly assembled on the first left combining portion 14 of the functional film body 10, such that the functional film body 10 is hung on the electronic device 2 by the left hanging rack component 20. It should be noted that the electronic device 2 may be a wearable electronic device, a portable smart device, a smart phone, a mobile phone, a tablet, a laptop, or a desktop computer, in other words, the hanging rack type screen protector 1 provided by the present invention can be used for electronic devices 2 generally sold in the market, without any issues of applicability.

The left hanging rack component 20 is made of a metallic or non-metallic material, and the left hanging rack component 20 and the functional film body 10 may have an integrally or non-integrally formed structural pattern. In this embodiment, the case where the left hanging rack component and the functional film body are non-integrally formed is used for description. When the left hanging rack component 20 and the functional film body 10 are non-integrally formed, further the left hanging rack component 20 is detachably assembled with the functional film body 10, or the left hanging rack component 20 is non-detachably assembled with the functional film body 10.

The left hanging rack component 20 has a left hanging rack portion 21 and a second left combining portion 22. The electronic device 2 further has a peripheral side 2-1. The left hanging rack portion 21 is attached to the peripheral side 2-1, and the second left combining portion 22 is attached to the first left combining portion 14, such that the functional film body 10 is hung on the electronic device 2 by the left hanging rack component 20.

The right hanging rack component 30 has an appearance structure which is in an L shape (as shown in FIG. 2B) from the side and is formed by a right hanging rack portion 31 and a second right combining portion 32. The second right combining portion 32 of the right hanging rack component 30 is correspondingly assembled on the first right combining portion 15 of the functional film body 10, such that the functional film body 10 is hung on the electronic device 2 by the right hanging rack component 30. It should be noted that the electronic device 2 may be a wearable electronic device, a portable smart device, a smart phone, a mobile phone, a tablet, a laptop, or a desktop computer, in other words, the hanging rack type screen protector 1 provided by the present invention can be used for electronic devices 2 generally sold in the market, without any issues of applicability.

The right hanging rack component 30 is made of a metallic or non-metallic material, and the right hanging rack component 30 and the functional film body 10 may be integrally or non-integrally formed. In this embodiment, the case where the right hanging rack component and the functional film body are non-integrally formed is used for description. When the right hanging rack component 30 and the functional film body 10 are non-integrally formed, further the right hanging rack component 30 is detachably assembled with the functional film body 10, or the right hanging rack component 30 is non-detachably assembled with the functional film body 10.

The right hanging rack component 30 has a right hanging rack portion 31 and a second right combining portion 32. The electronic device 2 further has a peripheral side 2-1. The right hanging rack portion 31 is attached to the peripheral side 2-1, and the second right combining portion 32 is attached to the first right combining portion 15, such that the functional film body 10 is hung on the electronic device 2 by the right hanging rack component 30.

In an embodiment of the hanging rack type screen protector provided by the present invention, the second left combining portion 22 of the left hanging rack component 20 is correspondingly assembled on the first left combining portion 14 of the functional film body 10 in a freely detachable manner, and the second right combining portion 32 of the right hanging rack component 30 is correspondingly assembled on the first right combining portion 15 of the functional film body 10 in a freely detachable manner.

In an embodiment of the hanging rack type screen protector provided by the present invention, the second left combining portion 22 of the left hanging rack component 20 is correspondingly assembled on the first left combining portion 14 of the functional film body 10 in a fixing manner, and the second right combining portion 32 of the right hanging rack component 30 is correspondingly assembled on the first right combining portion 15 of the functional film body 10 in a fixing manner, where the fixing manner includes at least one of adhering, gluing, laminating, attaching, fusing, pressing, and fastening.

Furthermore, according to the present invention, a length of the left hanging rack component 20 and the right hanging rack component 30 is not specifically limited, for example, may be ½ or less, usually ¼ or less, preferably 1/10 or less, more preferably 1/11 or less, and most preferably 1/12 or less of a width of the screen of the electronic device.

Furthermore, according to the present invention, a height of the left hanging rack component 20 and the right hanging rack component 30 is not specifically limited, for example, may be 0.5-2.5 times, usually 0.6-1.5 times, preferably 0.7-1.4 times, more preferably 0.8-1.3 times, and most preferably 0.9-1.2 times of a height of an outer bezel (a black bezel) in a visual area of the screen of the electronic device.

Furthermore, according to the present invention, a magnetic intensity of a magnetic suction material in the left hanging rack component 20 and the right hanging rack component 30 is applicable without special restrictions as long as basic functions of touch control and photoelectric control in the visual area of the screen can be prevented from being interfered, for example, may be 600-3,000 G, usually 700-2,500 G, preferably 800-2,100 G, more preferably 900-1,800 G, and most preferably 1,000-1,500 G.

In another embodiment of the hanging rack type screen protector provided by the present invention, the first left combining portion 14 has a first notch 221 corresponding in size and thickness to the second left combining portion 22 of the left hanging rack component 20, and the first right combining portion 15 has a second notch 321 corresponding in size and thickness to the second right combining portion 32 of the right hanging rack component 30, such that the second left combining portion 22 of the left hanging rack component 20 and the second right combining portion 32 of the right hanging rack component 30 can be assembled on the functional film body in a manner of forming a single plane or a coplanar surface.

In another embodiment of the hanging rack type screen protector provided by the present invention, the first notch 221 and the second notch 321 have a symmetric or asymmetric structure.

In another embodiment of the hanging rack type screen protector provided by the present invention, the left hanging rack portion 21 and the second left combining portion 22 are formed from a homogeneous or heterogeneous material, and the right hanging rack portion 31 and the second right combining portion 32 are formed from a homogeneous or heterogeneous material.

In another embodiment of the hanging rack type screen protector provided by the present invention, when the left hanging rack portion 21 and the second left combining portion 22 are formed from a homogeneous material, the left hanging rack portion 21 and the second left combining portion 22 are formed integrally or non-integrally; and when the right hanging rack portion 31 and the second right combining portion 32 are formed from a homogeneous material, the right hanging rack portion 31 and the second right combining portion 32 are formed integrally or non-integrally.

In another embodiment of the hanging rack type screen protector provided by the present invention, the functional film body 10 is further provided with an avoidance portion 101, and a position where the avoidance portion 101 is provided corresponds to a position of a functional component of the electronic device, so as to avoid shielding or covering part or whole of the functional component.

The functional component includes at least one of an image capture component, an audio transceiver component, an optical photography component, and a digital transmission component. The avoidance portion 101 includes at least one of an avoidance groove, a groove, a groove hole, a via hole, an open hole, a through hole, a notch, an opening, and a recess.

Figure 3A:
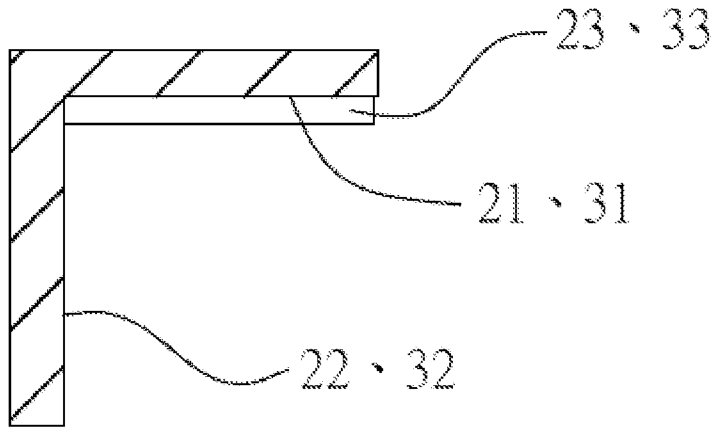
FIG. 3A shows a side view of an embodiment of a hanging rack type screen protector provided by the present invention.

Continuing referring to FIG. 3A which shows a side view of an embodiment of a hanging rack type screen protector provided by the present invention. The left hanging rack portion 21 of the left hanging rack component 20 is further provided with a left attaching body 23, where the left attaching body 23 may be formed from a wave-absorbing material, a magnetic material, or a repeatably attaching material.

The right hanging rack portion 31 of the right hanging rack component 30 is further provided with a right attaching body 33, where the right attaching body 33 may be formed from a wave-absorbing material, a magnetic material, or a repeatably attaching material.

Figure 3B:
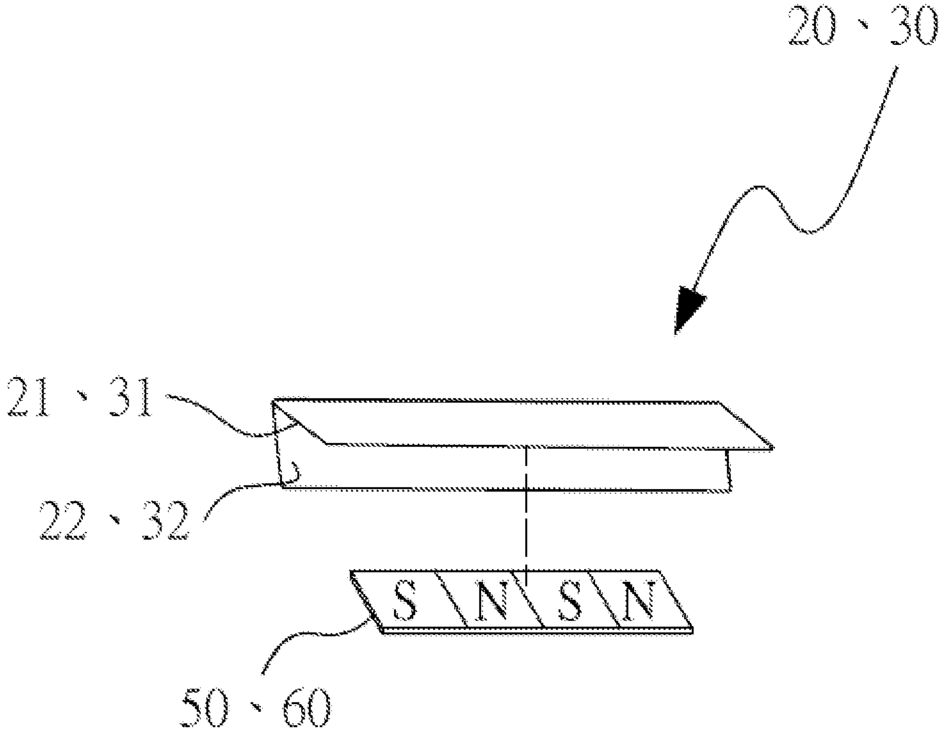
FIG. 3B shows a three-dimensional view of an embodiment of a hanging rack type screen protector provided by the present invention.

Furthermore, in this embodiment, the case where the left attaching body 23 and the right attaching body 33 are magnetic components is used for description. That is, as shown in FIG. 3B, the attaching body is a heteropolar staggered magnetic component, such that the left hanging rack component 20 and the right hanging rack component 30 can cause the functional film body 10 to be hung on the electronic device 2 by the left attaching body 23 and the right attaching body 33.

In another embodiment of the hanging rack type screen protector provided by the present invention, the left attaching body and the right attaching body are heteropolar staggered magnetic components, single N-pole discontinuous magnetic components, single S-pole discontinuous magnetic components, single N-pole two-end magnetic components, or single S-pole two-end magnetic components.

In another embodiment of the hanging rack type screen protector provided by the present invention, the magnetic material for forming the left attaching body and the right attaching body includes at least one of a sheet-shaped magnet, a strip-shaped magnet, a flexible magnet, an arc-shaped magnet, a permanent magnet, a non-permanent magnet, a natural magnet, an electromagnet, and a heat-resistant magnet.

Figure 4:
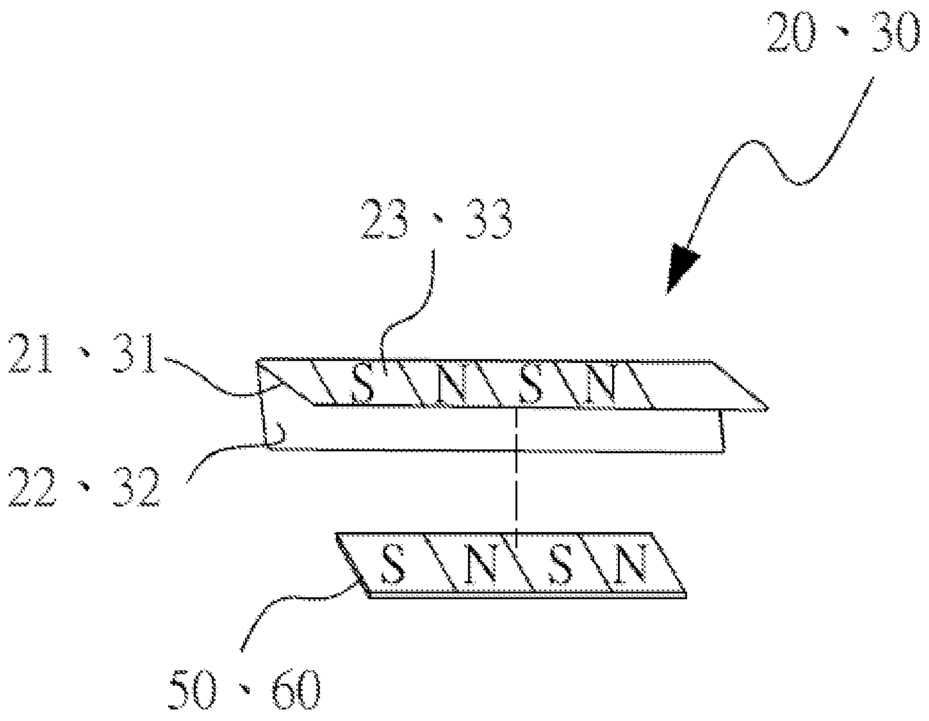
FIG. 4 shows a three-dimensional view of an embodiment of a hanging rack type screen protector provided by the present invention.
Figure 5:
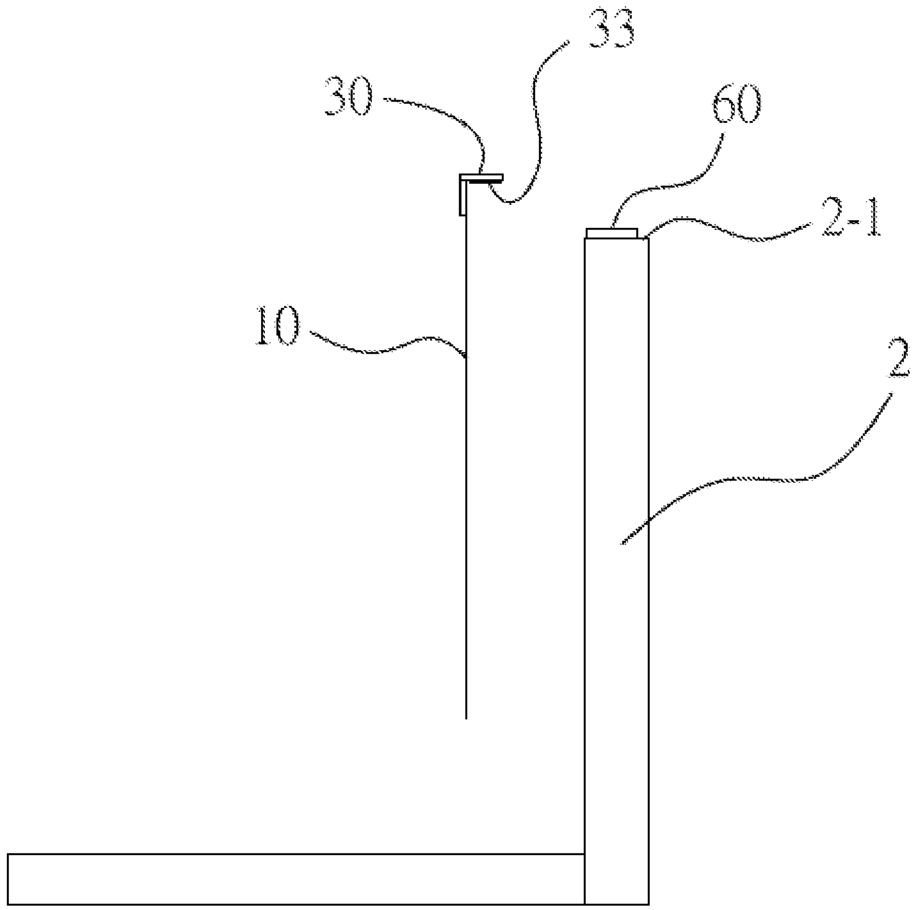
FIG. 5 shows a schematic structural diagram of an embodiment of a hanging rack type screen protector provided by the present invention.
Figure 6:
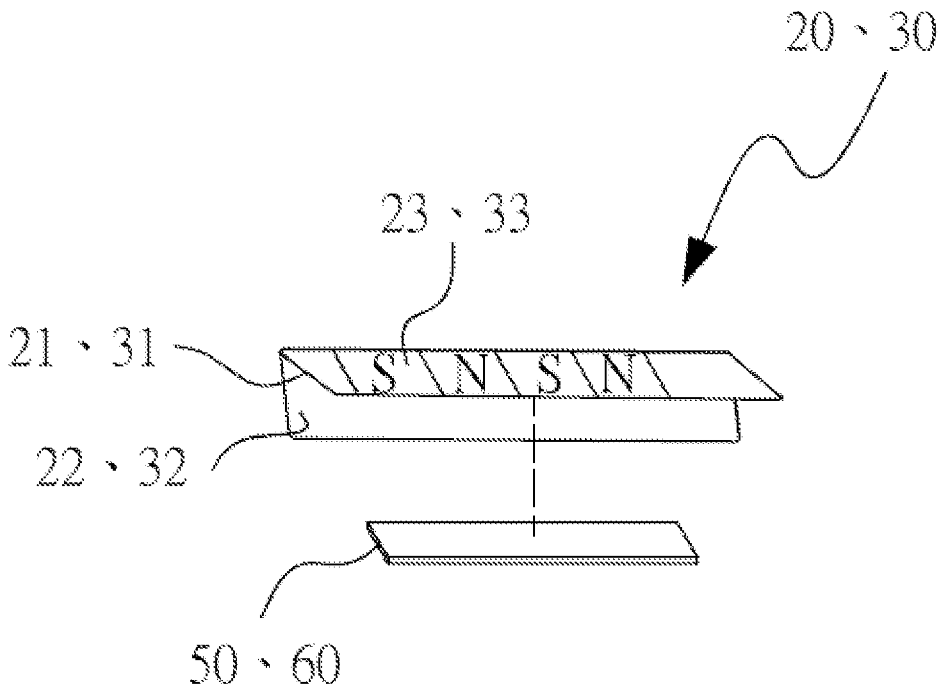
FIG. 6 shows a three-dimensional view of an embodiment of a hanging rack type screen protector provided by the present invention.

Referring to FIG. 4 and FIG. 5 which show a three-dimensional view and schematic structural diagram of an embodiment of a hanging rack type screen protector provided by the present invention, respectively, in addition to that the left hanging rack portion 21 of the left hanging rack component 20 is provided with the left attaching body 23, a left adsorption component 50 is further arranged on the peripheral side 2-1 of the electronic device 2, where the left adsorption component 50 may be formed from a wave-absorbing material, a magnetic material, or a repeatably attaching material and is arranged on the peripheral side of the electronic device in a freely detachable manner. In this embodiment, the left attaching body 23 and the left adsorption component 50 are heteropolar staggered magnetic components or may be formed from a wave-absorbing material or a magnetic material (as shown in FIG. 6), and the left adsorption component 50 is correspondingly in contact with and attached to the left attaching body 23, such that the functional film body 10 is hung on the electronic device 2.

Referring to FIG. 4 and FIG. 5 which show a three-dimensional view and schematic structural diagram of an embodiment of a hanging rack type screen protector provided by the present invention, respectively, in addition to that the right hanging rack portion 31 of the right hanging rack component 30 is provided with the right attaching body 33, a right adsorption component 60 is further arranged on the peripheral side 2-1 of the electronic device 2, where the right adsorption component 60 may be formed from a wave-absorbing material, a magnetic material, or a repeatably attaching material and is arranged on the peripheral side of the electronic device in a freely detachable manner. In this embodiment, the right attaching body 33 and the right adsorption component 60 are heteropolar staggered magnetic components or may be formed from a wave-absorbing material or a magnetic material (as shown in FIG. 6), and the right adsorption component 60 is correspondingly in contact with and attached to the right attaching body 33, such that the functional film body 10 is mounted on the electronic device 2.

Figure 7:
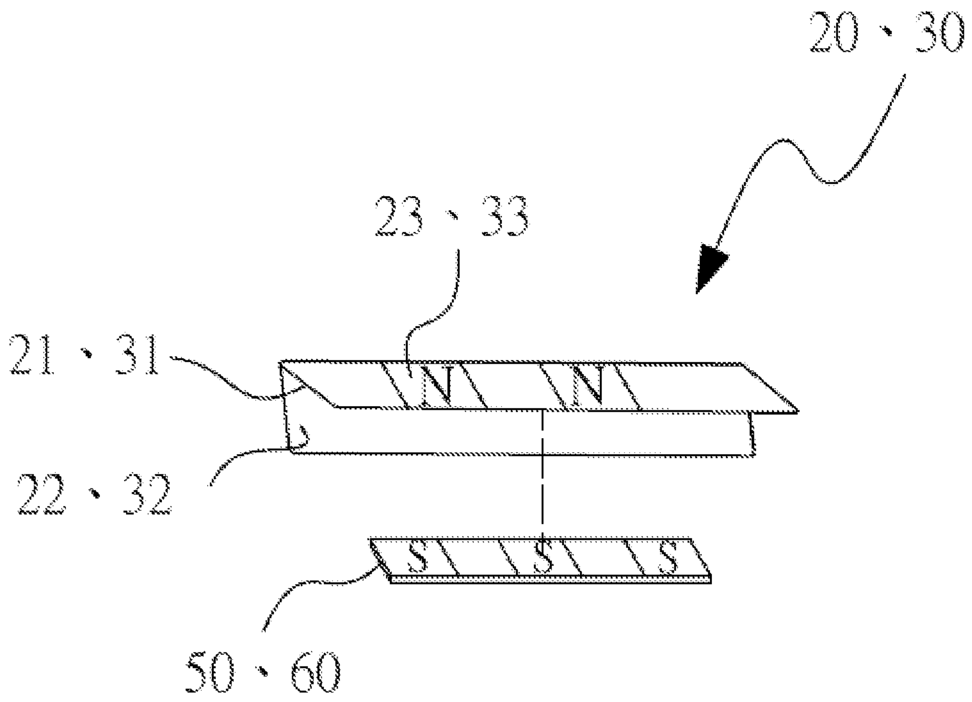
FIG. 7 shows a three-dimensional view of an embodiment of a hanging rack type screen protector provided by the present invention.

Referring to FIG. 7 which shows a three-dimensional view of an embodiment of a hanging rack type screen protector provided by the present invention, in an embodiment, the left hanging rack component 20 includes a single N-pole discontinuous magnetic component disposed on the left hanging rack portion 21 in a discontinuous arrangement manner, while the left adsorption component 50 includes a single S-pole discontinuous magnetic component, but it should be noted that N-pole magnetic components of the left hanging rack component 20 and the left adsorption component 50 are mutually staggered.

In another embodiment of the hanging rack type screen protector provided by the present invention, the left hanging rack component 20 includes a single S-pole discontinuous magnetic component disposed on the left hanging rack portion 21 in a discontinuous arrangement manner, while the left adsorption component 50 includes a single N-pole discontinuous magnetic component, but it should be noted that S-pole magnetic components of the left hanging rack component 20 and the left adsorption component 50 are mutually staggered.

Referring to FIG. 7 which shows a three-dimensional view of an embodiment of a hanging rack type screen protector provided by the present invention, in an embodiment, the right hanging rack component 30 includes a single N-pole discontinuous magnetic component disposed on the right hanging rack portion 31 in a discontinuous arrangement manner, while the right adsorption component 60 includes a single S-pole discontinuous magnetic component, but it should be noted that N-pole magnetic components of the right hanging rack component 30 and the right adsorption component 60 are mutually staggered.

In another embodiment of the hanging rack type screen protector provided by the present invention, the right hanging rack component 30 includes a single S-pole discontinuous magnetic component disposed on the right hanging rack portion 31 in a discontinuous arrangement manner, while the right adsorption component 60 includes a single N-pole discontinuous magnetic component, but it should be noted that S-pole magnetic components of the right hanging rack component 30 and the right adsorption component 60 are mutually staggered.

Figure 8:
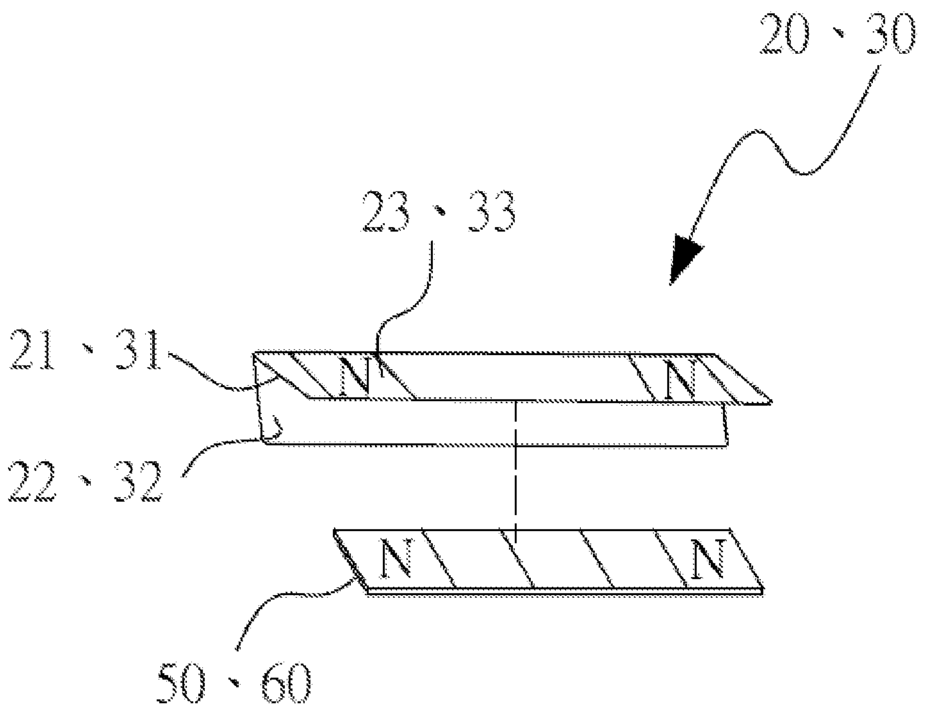
FIG. 8 shows a three-dimensional view of an embodiment of a hanging rack type screen protector provided by the present invention.

Referring to FIG. 8 which shows a three-dimensional view of an embodiment of a hanging rack type screen protector provided by the present invention, in an embodiment, the left hanging rack component 20 includes single N-pole discontinuous magnetic components arranged at two ends of the left hanging rack portion 21, while the left adsorption component 50 includes single N-pole discontinuous magnetic components attached to and combined with the magnetic components of the left hanging rack portion 21 in an aligned manner.

In another embodiment of the hanging rack type screen protector provided by the present invention, the left hanging rack component 20 includes single S-pole discontinuous magnetic components arranged at two ends of the left hanging rack portion 21, while the left adsorption component 50 includes single S-pole discontinuous magnetic components attached to and combined with the magnetic components of the left hanging rack portion 21 in an aligned manner.

Referring to FIG. 8 which shows a three-dimensional view of an embodiment of a hanging rack type screen protector provided by the present invention, in an embodiment, the right hanging rack component 30 includes single N-pole discontinuous magnetic components arranged at two ends of the right hanging rack portion 31, while the right adsorption component 60 includes single N-pole discontinuous magnetic components attached to and combined with the magnetic components of the right hanging rack portion 31 in an aligned manner.

In another embodiment of the hanging rack type screen protector provided by the present invention, the right hanging rack component 30 includes single S-pole discontinuous magnetic components arranged at two ends of the right hanging rack portion 31, while the right adsorption component 60 includes single S-pole discontinuous magnetic components attached to and combined with the magnetic components of the right hanging rack portion 31 in an aligned manner.

Figure 9A:
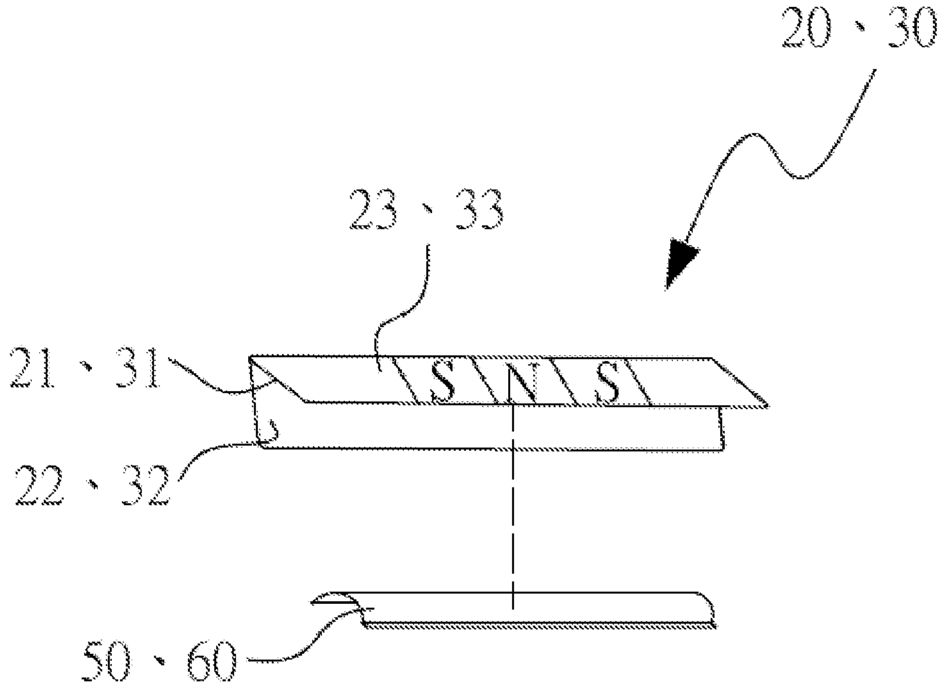
FIG. 9A shows a three-dimensional view of an embodiment of a hanging rack type screen protector provided by the present invention.
Figure 9B:
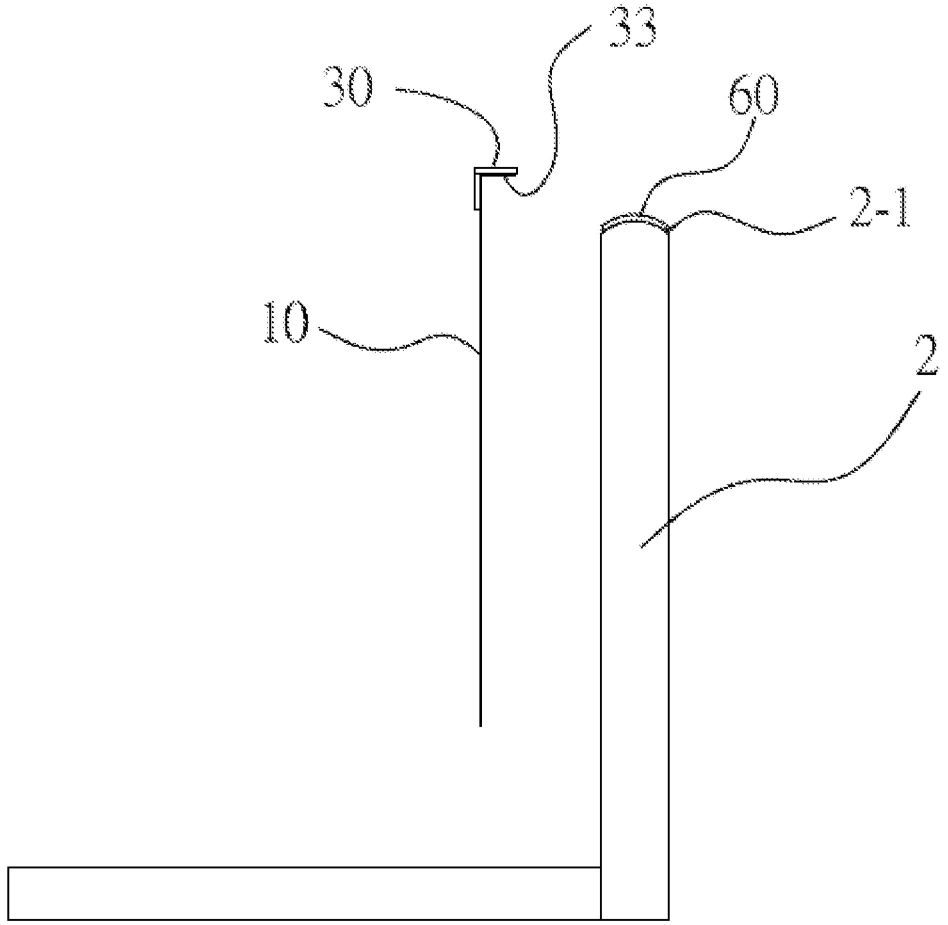
FIG. 9B shows a schematic structural diagram of an embodiment of a hanging rack type screen protector provided by the present invention.

Referring to FIGS. 9A and 9B which show a three-dimensional view and schematic structural diagram of an embodiment of a hanging rack type screen protector provided by the present invention, respectively, there is a difference between this embodiment and the foregoing embodiment that the left adsorption component 50 and the right adsorption component 60 arranged on the peripheral side 2-1 of the electronic device 2 are formed from a material with a radian; and the left hanging rack portion 21 and the right hanging rack portion 31 are also formed from a material with a corresponding radian. That is to say, in this embodiment, the hanging rack type screen protector provided by the present invention is particularly suitable for use in an electronic device 2 with a peripheral side 2-1 having a radian or a non-right angled contour. Furthermore, according to the technical idea of the present invention, it is suitable to be used as a material with a radian without special restrictions, for example, any one or more of an iron part, an alloy, a hard material, a flexible body, and the like may be used.

Furthermore, the left hanging rack component 20 attached to the left hanging rack portion 21 includes a heteropolar staggered magnetic component and is correspondingly in contact with and attached to the left adsorption component 50; and the right hanging rack component 30 attached to the right hanging rack portion 31 includes a heteropolar staggered magnetic component and is correspondingly in contact with and attached to the right adsorption component 60, such that the functional film body 10 is hung on the electronic device 2.

Figure 10:
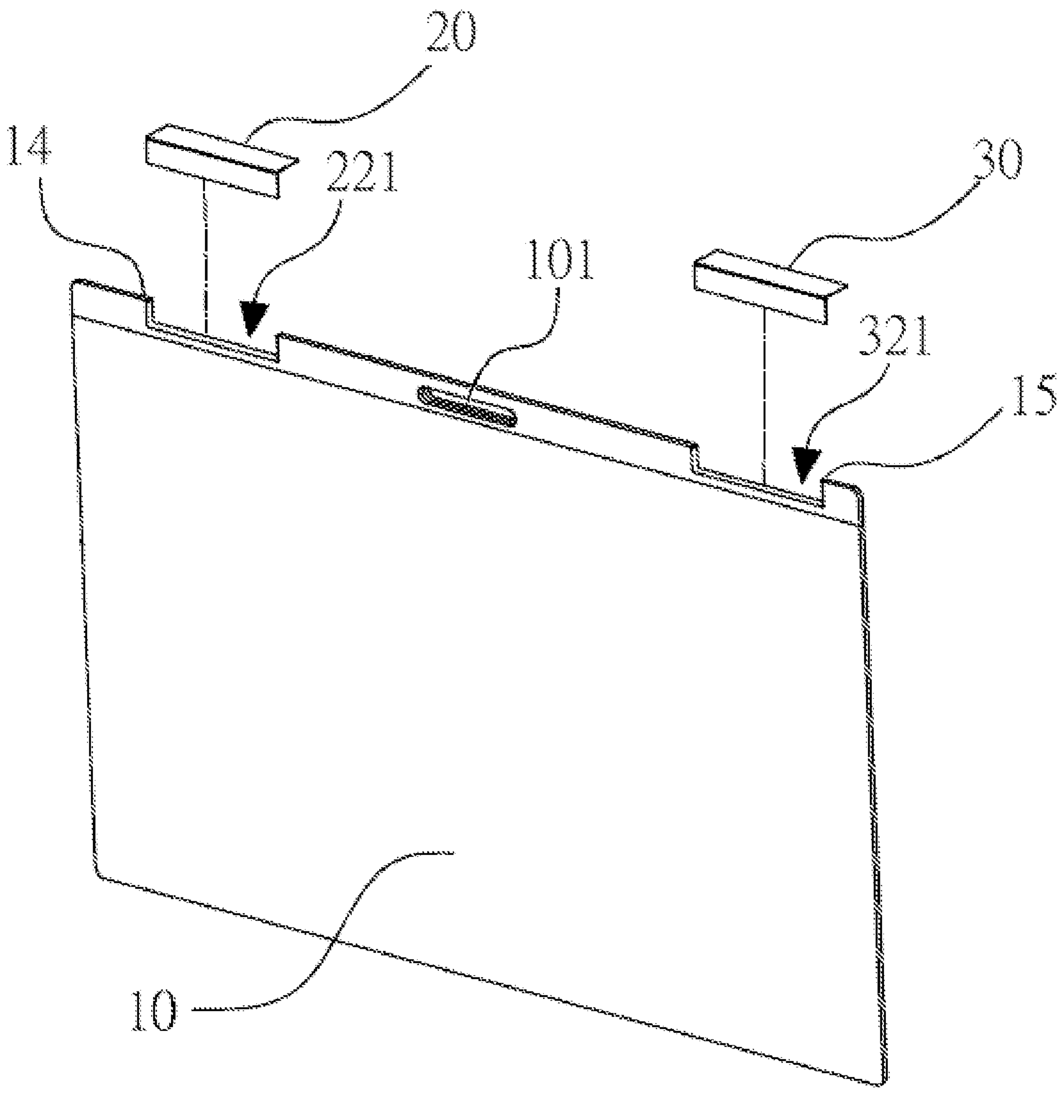
FIG. 10 shows a three-dimensional exploded view of an embodiment of a hanging rack type screen protector provided by the present invention.

Referring to FIG. 10 which shows a three-dimensional exploded view of an embodiment of a hanging rack type screen protector provided by the present invention, the first left combining portion 14 of the functional film body 10 has a structural pattern of a first notch 221 in this embodiment, a periphery of the second left combining portion 22 of the left hanging rack component 20 is correspondingly in contact with a periphery of the first notch 221, and the periphery of the second left combining portion 22 is connected to and combined with the periphery of the first notch 221 in an engineering bonding manner, where the bonding manner may be a manner of bonding between common parts in engineering, such as diffusion bonding, adhering, ultrasonic waves, gluing, or cladding, such that the combination of the functional film body 10 and the left hanging rack component 20 is completed.

Referring to FIG. 10 which shows a three-dimensional exploded view of an embodiment of a hanging rack type screen protector provided by the present invention, the first right combining portion 15 of the functional film body 10 has a structural pattern of a second notch 321 in this embodiment, a periphery of the second right combining portion 32 of the right hanging rack component 30 is correspondingly in contact with a periphery of the second notch 321, and the periphery of the second right combining portion 32 is connected to and combined with the periphery of the second notch 321 in an engineering bonding manner, where the bonding manner may be a manner of bonding between common parts in engineering, such as diffusion bonding, adhering, ultrasonic waves, gluing, or cladding, such that the combination of the functional film body 10 and the right hanging rack component 30 is completed.

Figure 11:
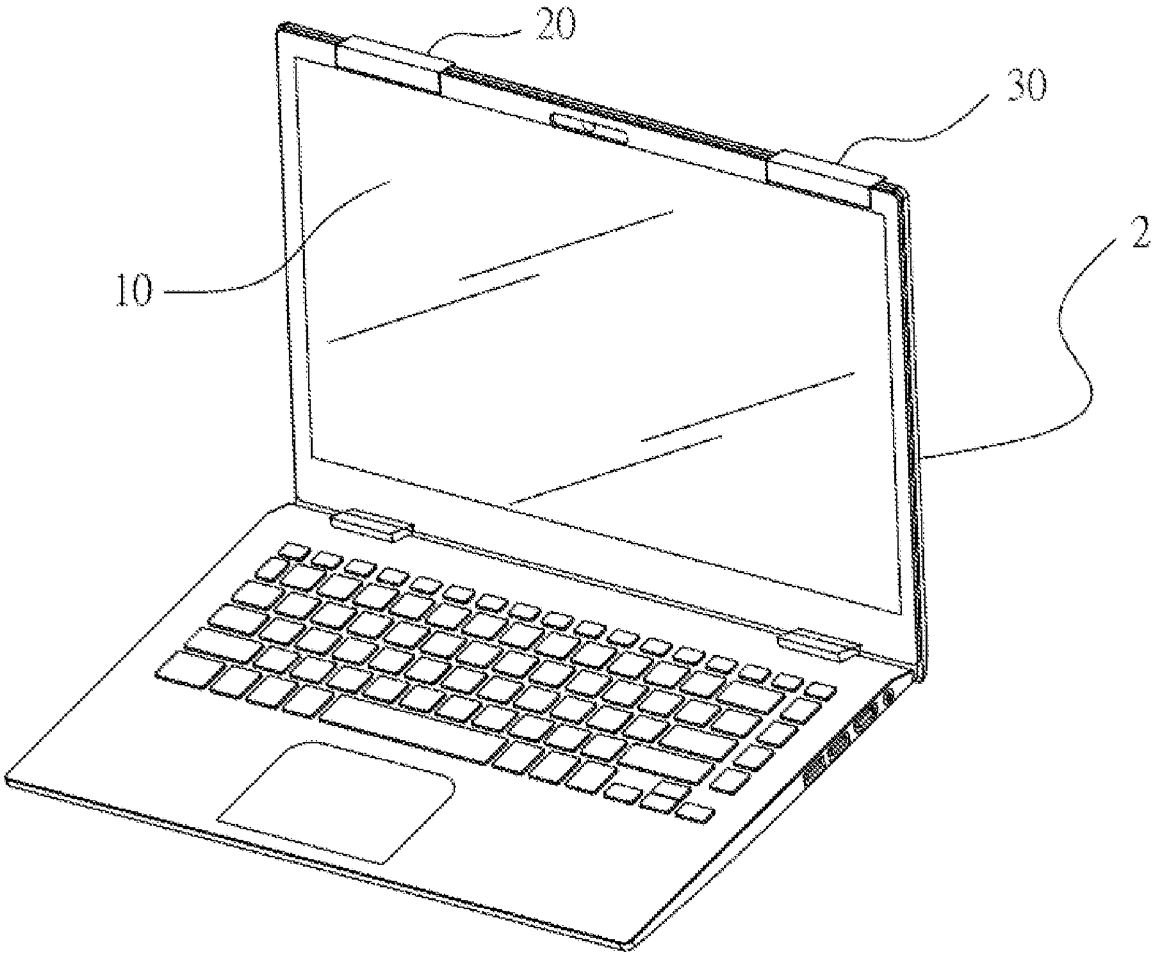
FIG. 11 shows a schematic implementation view of a hanging rack type screen protector provided by the present invention.

Jointly referring to FIG. 11 which shows a schematic implementation view of the present invention, through the design of the structure of the present invention, the left hanging rack component 20 and the right hanging rack component 30 are correspondingly assembled at the first left combining portion 14 and the first right combining portion 15 of the functional film body 10, and then the functional film body 10 provided with the left hanging rack component 20 and the right hanging rack component 30 is hung on the electronic device 2, to maintain the privacy during use; the hanging rack type screen protector 1 can be easily mounted or taken down, thereby greatly improving the convenience of assembly; and the existing operation functions of the electronic device can be kept and the screen touch function or other adverse effects cannot be reduced.

Furthermore, according to the technical idea of the present invention, after being assembled, the left hanging rack component, the right hanging rack component, and the functional film body are not specially limited in relative position relationship, for example, the left hanging rack component 20 and/or the right hanging rack component 30 may be arranged on a front surface (for example, referring to FIG. 5 and FIG. 9B) or a rear surface (not shown in figure) of the functional film body 10; besides, the left hanging rack component 20 and/or the right hanging rack component 30 may be arranged to form a single plane or a coplanar surface (for example, as shown in FIG. 10) with the functional film body 10, or may be partially exposed from the front surface (not shown in figure) or the rear surface (not shown in figure).

In addition, according to the technical idea of the present invention, the left hanging rack component 20 and the right hanging rack component 30 of the hanging rack type screen protector 1 provided by the present invention are simple in structure and easy to industrially manufacture and produce, such that the production cost can be reduced.

In summary, according to the present invention, a hanging rack type screen protector configured to protect a display screen of an electronic device and prevent others from peeking at images, pictures, or content presented on the display screen can be provided. Compared with conventional mounting by means of direct attaching or adhering or by adding adsorption accessories or magnetic strips, the screen protector provided by the present invention not only can effectively solve and overcome the above problems and deficiencies in the prior art, but has excellent effects of greatly reducing the manufacturing and production costs and improving the convenience, stability, reliability and the like of assembly.

The patent literature and publications mentioned in this specification demonstrate the technical levels familiar to those skilled in the art of the present invention. These documents and publications are all incorporated herein as references to the same extent as each document or publication is incorporated into this specification in a specific and separate reference manner.

The above embodiments are intended to illustrate the technical content and features of the present invention, to enable those skilled in the art to understand, manufacture, and use the present invention. However, these embodiments are not intended to limit the scope of the present invention. On the contrary, any equivalent modifications or variations in accordance with the spirit of the present invention should also be included within the scope of the claims of the present invention. The claims of the present invention should be interpreted in the broadest sense as covering all equivalent modifications and variations.

The foregoing description is an explanation of specific embodiments of the present invention, but does not imply any limitations on its implementation. The scope of the following patent application, including all its equivalents, is intended to limit the scope of the present invention.

DESCRIPTION OF SYMBOLS

1: hanging rack type screen protector
2: electronic device
2-1: peripheral side
10: functional film body
101: avoidance portion
11: functional layer
12: top surface layer
13: bottom surface layer
14: first left combining portion
15: first right combining portion
20: left hanging rack component
21: left hanging rack portion
22: second left combining portion
221: first notch
23: left attaching body
30: right hanging rack component
31: right hanging rack portion
32: second right combining portion
321: second notch
33: right attaching body
50: left adsorption component
60: right adsorption component

The invention claimed is:

1. A hanging rack type screen protector, configured to protect a display screen of an electronic device and prevent others from peeking at images, pictures, or content presented on the display screen, the screen protector comprising:

a functional film body, having a plurality of optical gratings configured to define a viewing area, so as to limit passing light to a range of allowable visual angles, the functional film body comprises a first left combining portion formed in an upper left region and a first right combining portion formed in an upper right region;

a left hanging rack component, having an appearance structure which is approximately L-shaped from the side and formed by a left hanging rack portion and a second left combining portion, the second left combining portion of the left hanging rack component being correspondingly assembled on the first left combining portion of the functional film body; and a right hanging rack component, having an appearance structure which is approximately L-shaped from the side and formed by a right hanging rack portion and a second right combining portion, the second right combining portion of the right hanging rack component being correspondingly assembled on the first right combining portion of the functional film body;

wherein the left hanging rack component and the right hanging rack component are assembled on the functional film body in a manner of forming a single plane or a coplanar surface with the functional film body, and wherein the functional film body is freely hung on or freely detached or removed from the electronic device by the left hanging rack component and the right hanging rack component;

wherein the functional film body comprises at least:

a functional layer, which is a light-transmitting film or a light-transmitting laminated body;

a top surface layer, formed on an upper side of the functional layer;

a bottom surface layer, formed on a lower side of the functional layer;

a first bonding layer, comprised between the functional layer and the top surface layer; and a second bonding layer, comprised between the functional layer and the bottom surface layer, wherein each of the first bonding layer and the second bonding layer has an optical transmittance of 90% or more and a haze of 1% or less.

2. The hanging rack type screen protector according to claim 1, wherein the second left combining portion of the left hanging rack component is correspondingly assembled on the first left combining portion of the functional film body in a freely detachable manner, and the second right combining portion of the right hanging rack component is correspondingly assembled on the first right combining portion of the functional film body in a freely detachable manner.

3. The hanging rack type screen protector according to claim 1, wherein the left hanging rack component is further provided with a left attaching body at the left hanging rack portion, and the right hanging rack component is further provided with a right attaching body at the right hanging rack portion, the left attaching body and the right attaching body being formed from a wave-absorbing material, a magnetic material, or a repeatably attaching material.

4. The hanging rack type screen protector according to claim 3, wherein the left attaching body and the right attaching body are heteropolar staggered magnetic components, single N-pole discontinuous magnetic components, single S-pole discontinuous magnetic components, single N-pole two-end magnetic components, or single S-pole two-end magnetic components.

5. The hanging rack type screen protector according to claim 3, wherein the magnetic material for forming the left attaching body and the right attaching body comprises at least one of a sheet-shaped magnet, a strip-shaped magnet, a flexible magnet, an arc-shaped magnet, a permanent magnet, a non-permanent magnet, a natural magnet, an electromagnet, and a heat-resistant magnet.

6. The hanging rack type screen protector according to claim 1, further comprising a left adsorption component and a right adsorption component, wherein the left adsorption component and the right adsorption component are formed from a wave-absorbing material, a magnetic material, or a repeatably attaching material and are arranged on a peripheral side of the electronic device in a freely detachable manner.

7. The hanging rack type screen protector according to claim 1, wherein the second left combining portion of the left hanging rack component is correspondingly assembled on the first left combining portion of the functional film body in a fixing manner, and the second right combining portion of the right hanging rack component is correspondingly assembled on the first right combining portion of the functional film body in a fixing manner, the fixing manner comprising at least one of adhering, gluing, laminating, attaching, fusing, pressing, and fastening.

8. The hanging rack type screen protector according to claim 1, wherein the first left combining portion of the functional film body has a first notch corresponding in size and thickness to the second left combining portion of the left hanging rack component, and the first right combining portion of the functional film body has a second notch corresponding in size and thickness to the second right combining portion of the right hanging rack component, such that the second left combining portion of the left hanging rack component and the second right combining portion of the right hanging rack component are capable of being assembled on the functional film body in a manner of forming a single plane or a coplanar surface.

9. The hanging rack type screen protector according to claim 1, wherein the left hanging rack portion and the second left combining portion are formed from a homogeneous or heterogeneous material, and the right hanging rack portion and the second right combining portion are formed from a homogeneous or heterogeneous material.

10. The hanging rack type screen protector according to claim 1, wherein the electronic device is a wearable electronic device, a portable smart device, a smart phone, a mobile phone, a tablet, a laptop, or a desktop computer.

11. The hanging rack type screen protector according to claim 1, wherein the functional film body is further provided with an avoidance portion, a position where the avoidance portion is provided corresponds to a position where a functional component of the electronic device is formed, so as to avoid shielding or covering part or whole of the functional component, and the functional component comprises at least one of an image capture component, an audio transceiver component, an optical photography component, and a digital transmission component.

12. The hanging rack type screen protector according to claim 11, wherein the avoidance portion comprises at least one of an avoidance groove, a notch, an opening, a recess, a groove, a groove hole, a via hole, an open hole, and a through hole.

13. The hanging rack type screen protector according to claim 1, further comprising an auxiliary fixing piece attached to the functional film body and configured to improve the fixation strength between the functional film body and the electronic device, wherein the auxiliary fixing piece is a magnetic component or a non-magnetic component.

14. The hanging rack type screen protector according to claim 13, wherein the magnetic component configured to form the auxiliary fixing piece is a permanent magnetic component, a soft magnetic component, or a gyromagnetic component formed from at least one of a metal, an alloy, or a ferrite.

15. A hanging rack type screen protector, configured to protect a display screen of an electronic device and prevent others from peeking at images, pictures, or content presented on the display screen, the screen protector comprising:

a functional film body, having a plurality of optical gratings configured to define a viewing area, so as to limit passing light to a range of allowable visual angles, the functional film body comprises a first left combining portion formed in an upper left region and a first right combining portion formed in an upper right region, a left hanging rack component, having an appearance structure which is approximately L-shaped from the side and formed by a left hanging rack portion and a second left combining portion, the second left combining portion of the left hanging rack component being correspondingly assembled on the first left combining portion of the functional film body; and a right hanging rack component, having an appearance structure which is approximately L-shaped from the side and formed by a right hanging rack portion and a second right combining portion, the second right combining portion of the right hanging rack component being correspondingly assembled on the first right combining portion of the functional film body; wherein the functional film body is freely hung on or freely detached or removed from the electronic device by the left hanging rack component and the right hanging rack component;

wherein the functional film body comprises at least:

a functional layer, which is a light-transmitting film or a light-transmitting laminated body;

a top surface layer, formed on an upper side of the functional layer;

a bottom surface layer, formed on a lower side of the functional layer;

a first bonding layer, comprised between the functional layer and the top surface layer; and a second bonding layer, comprised between the functional layer and the bottom surface layer, wherein each of the first bonding layer and the second bonding layer has an optical transmittance of 90% or more and a haze of 1% or less.

16. The hanging rack type screen protector according to claim 15, wherein the left hanging rack component is further provided with a left attaching body at the left hanging rack portion, and the right hanging rack component is further provided with a right attaching body at the right hanging rack portion, the left attaching body and the right attaching body being formed from a wave-absorbing material, a magnetic material, or a repeatably attaching material.

17. The hanging rack type screen protector according to claim 16, wherein the magnetic material for forming the left attaching body and the right attaching body comprises at least one of a sheet-shaped magnet, a strip-shaped magnet, a flexible magnet, an arc-shaped magnet, a permanent magnet, a non-permanent magnet, a natural magnet, an electromagnet, and a heat-resistant magnet.

* * * * *